No. 619,530. Patented Feb. 14, 1899.
B. S. ATWOOD.
SAW.
(Application filed Dec. 14, 1897.)

(No Model.)

WITNESSES
Frank G. Parker
Frank G. Hattie

INVENTOR
Benjamin S. Atwood

THE NORRIS PETERS CO., PHOTO-LITHO., WASHINGTON, D. C.

UNITED STATES PATENT OFFICE.

BENJAMIN S. ATWOOD, OF WHITMAN, MASSACHUSETTS.

SAW.

SPECIFICATION forming part of Letters Patent No. 619,530, dated February 14, 1899.

Application filed December 14, 1897. Serial No. 661,869. (No model.)

*To all whom it may concern:*

Be it known that I, BENJAMIN S. ATWOOD, of Whitman, in the county of Plymouth and State of Massachusetts, have invented a new and useful Improvement in Saws, of which the following, taken in connection with the accompanying drawings, is a specification.

My invention relates to the construction of circular saws; and it consists in making a circular saw or rotating cutter having but one tooth and that having a thin web to strengthen it, the tooth being of the hawk-bill order, and the web extends from the inner line of the tooth to the body or disk and is so arranged as not to interfere with the cutting action of the tooth.

The object is to make a circular cutter or saw that will work with the least possible friction and be easily kept in good cutting order. This object I attain by the mechanism shown in the accompanying drawings, in which—

Figure 1:
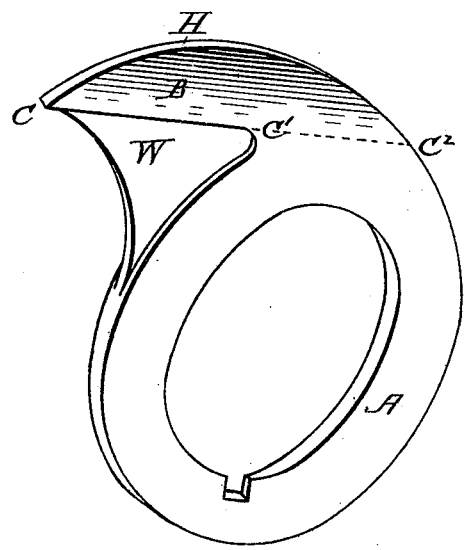
Figure 2:
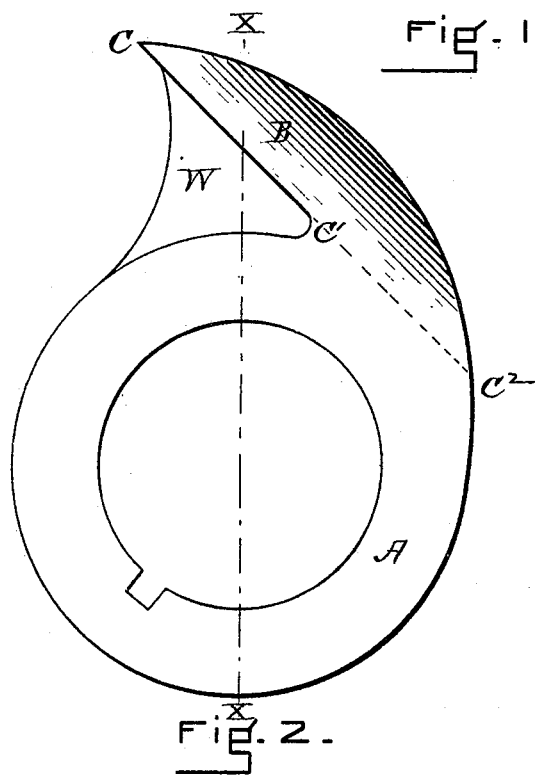
Figure 3:
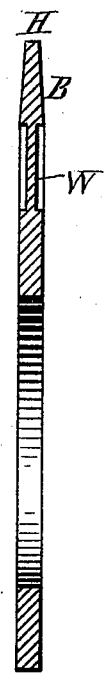

Figure 1 shows one of my cutters or saws in perspective. Fig. 2 is a plan of the same. Fig. 3 is a cross-section taken on line $x\,x$ of Fig. 2.

I have preferred to class my instrument as a saw for the reason that it takes the place of a saw, although it resembles a cutter in outline.

The body A of this instrument is made in the form shown and of the desired thickness. The cutting member B is practically of the shape shown, the work of cutting being wholly performed by the point C. As this point wears away in working or is ground off in sharpening it is necessary to file or grind off the web W. The cutter is of full thickness on the line C C', so that the cutting-point will always remain of the same thickness. To obtain a good clearance, that part of the cutter which is outside of the line C C' C² is made thinner—*i. e.*, wedge-shaped—as shown in section in Fig. 3. The web W is made thinner than the other parts, so as to cause no friction, and yet thick enough to throw out the chips made by the cutter.

The entire cutter is made of a single piece of steel, and the cutting member B is supported and strengthened by the web W, so that there is no danger of it breaking. In arranging these cutters on an arbor they are so placed as to have the cutting-point of one set at about ninety degrees from the next one, so that strain on the shaft is evenly distributed and the cutting action on the board constant and without jar or shock.

By constructing a saw as above set forth I have a cutter or saw that works with the least possible friction and cannot clog, as the entire circumference except the one cutting member is removed. No part of the saw is in the kerf except the cutter itself, and that is made strong and durable and in such form as to be easily kept in order.

I claim—

A rotating cutting tool or saw made of a single piece of metal having a disk whereby it is attached to the arbor; a tooth B undercut as described and having a web thinner than the cutting edge of the tooth and extending centrally from the inner line of the tooth to the said disk, the outer part of said tooth being also made thinner than its cutting edge, substantially as and for the purpose set forth.

In testimony whereof I have signed my name to this specification, in the presence of two subscribing witnesses, on this 8th day of December, A. D. 1897.

BENJAMIN S. ATWOOD.

Witnesses:
FRANK G. PARKER,
FRANK G. HATTIE.